United States Patent
Lotspiech et al.

[11] Patent Number: 5,913,030
[45] Date of Patent: Jun. 15, 1999

[54] METHOD AND SYSTEM FOR CLIENT/SERVER COMMUNICATIONS WITH USER INFORMATION REVEALED AS A FUNCTION OF WILLINGNESS TO REVEAL AND WHETHER THE INFORMATION IS REQUIRED

[75] Inventors: Jeffrey Bruce Lotspiech, San Jose, Calif.; Robert John Tasman Morris, Ridgefield, Conn.

[73] Assignee: International Business Machines Corporation, Armonk, N.Y.

[21] Appl. No.: 08/819,345

[22] Filed: Mar. 18, 1997

[51] Int. Cl.$^6$ .................................................. G06F 17/60
[52] U.S. Cl. ........................... 395/200.33; 348/10; 705/27
[58] Field of Search ........................... 348/7, 10; 705/27; 707/1; 395/200, 33

[56] References Cited

U.S. PATENT DOCUMENTS

| | | | |
|---|---|---|---|
| 5,155,591 | 10/1992 | Wachob | 348/9 |
| 5,319,455 | 6/1994 | Hoarty et al. | 348/7 |
| 5,367,330 | 11/1994 | Haave et al. | 348/7 |
| 5,428,778 | 6/1995 | Brookes | 707/5 |
| 5,446,919 | 8/1995 | Wilkins | 455/6.2 |
| 5,459,306 | 10/1995 | Stein et al. | 235/383 |
| 5,661,516 | 8/1997 | Carles | 348/8 |
| 5,717,923 | 2/1998 | Dedrick | 380/24 |
| 5,724,521 | 3/1998 | Dedrick | 348/7 |
| 5,724,567 | 3/1998 | Rose et al. | |
| 5,740,549 | 4/1998 | Reilly et al. | 705/14 |

*Primary Examiner*—Kenneth S. Kim
*Attorney, Agent, or Firm*—James C. Pintner; Morgan & Finnegan LLP

[57] ABSTRACT

A method and system for communications between a client system and a server communicatively coupled to the client system. User information about a user is stored on the client system. The user information comprises a plurality of attributes. Each attribute comprises information relating to the user and a willingness level indicator, indicating a level of willingness of the user to reveal the information of that attribute. A user information request is received from the server. The user information request comprises a plurality of attribute requests. Each attribute request comprises an indication of whether the attribute is required in order for the server to transmit information stored on the server to the client system. At the client system, the received attribute requests are compared with the stored attributes to determine whether each requested attribute is present on the client system. At the client system, it is determined for each requested attribute that is present on the client system, whether the attribute is to be transmitted to the server as a function of the willingness level indicator of the attribute and the indication of whether the attribute is required. Each attribute that has been determined is to be transmitted is transmitted to the server.

32 Claims, 13 Drawing Sheets

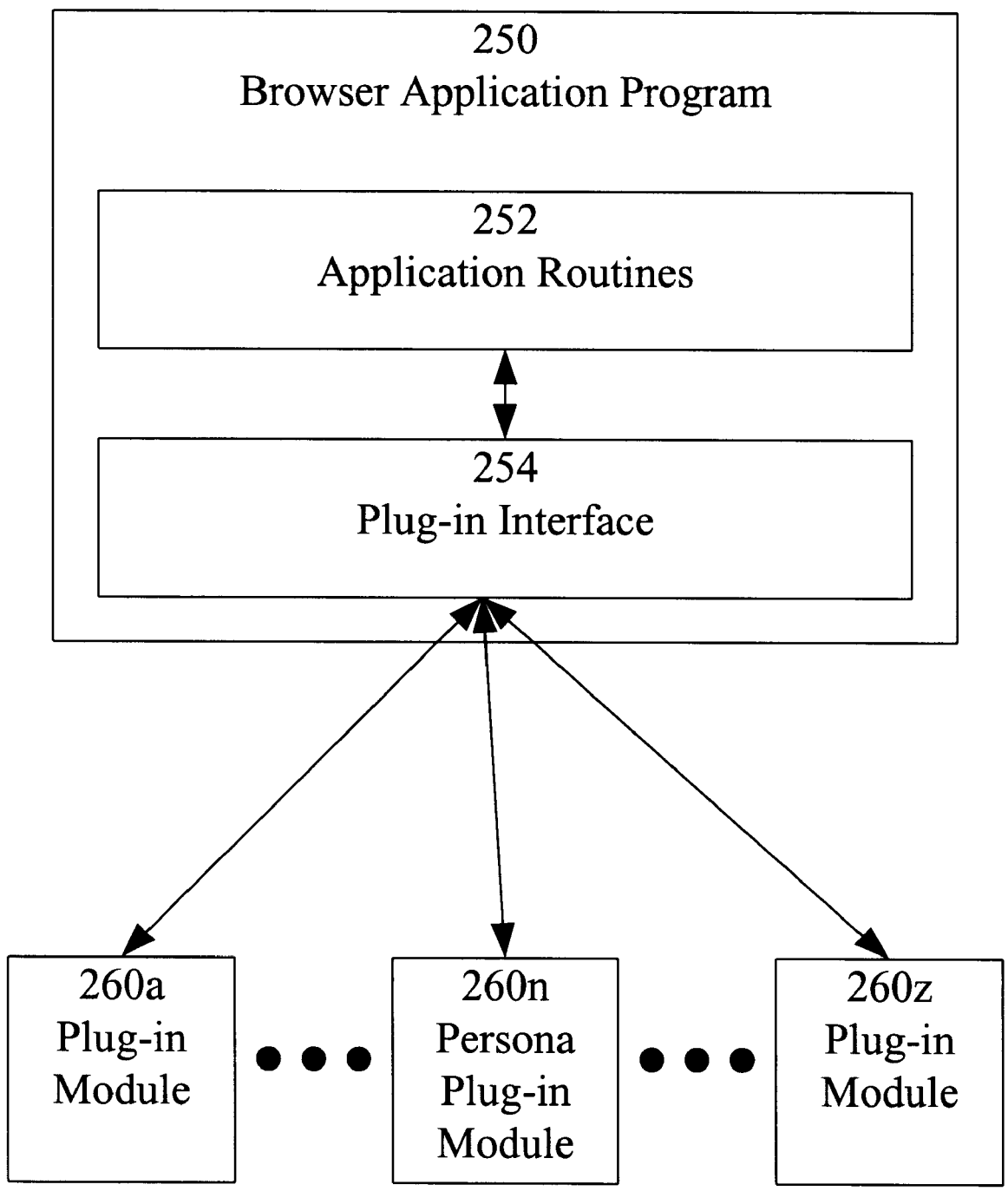

Fig. 5a

| 318 Persona Definition | | | |
|---|---|---|---|
| 502 Attribute | 504 Type | 506 Willingness | 508 Value |
| Name | Data | Always, Don't Notify | "John Doe" |
| Address | Data | Always, Notify | "123 First Street" |
| Telephone Number | Data | Request | "800-555-5555" |
| Credit Card Number | Data | Never | --- |
| Software Version | Calculated | Request | Reference to Routine Which Performs Calculation |
| | | | |
| | | | |
| | | | |
| | | | |
| | | | |

510a — Name row
510b — Address row
510c — Telephone Number row
510d — Credit Card Number row
510e — Software Version row

Fig. 5b

| 520 Request ||
|---|---|
| 522 Attribute | 524 Required? |
| Name | Yes |
| Address | Yes |
| Telephone Number | Yes |
| Credit Card Number | No |
|  |  |
|  |  |
|  |  |

526a — Name row
526b — Address row
526c — Telephone Number row
526d — Credit Card Number row

Fig 5c 530
532
534  http://xyz.com/nifty.content

?name=john_doe&address=123_first_street&telephone_number=800-555-5555

Fig. 7

| 700 User's Interest Vector ||
|---|---|
| 702 Attribute | 704 Interest |
| Skiing | High |
| Golf | Low |
| Web | High |
| Car Racing | None |
| Beer | High |
| Fashion Hats | None |
| African Violets | ? |
| Erutrean Art | High |
|  |  |

706a — Skiing
706b — Golf
706c — Web
706d — Car Racing
706e — Beer
706f — Fashion Hats
706g — African Violets
706h — Erutrean Art 5,913,030

METHOD AND SYSTEM FOR CLIENT/SERVER COMMUNICATIONS WITH USER INFORMATION REVEALED AS A FUNCTION OF WILLINGNESS TO REVEAL AND WHETHER THE INFORMATION IS REQUIRED

FIELD OF THE INVENTION

The present invention relates to a method and system for client/server communications and in particular to user control of revealed and delivered information.

BACKGROUND OF THE INVENTION

The World Wide Web has become a popular medium of communication. Information on a wide variety of topics is available with just a few clicks of a mouse. However, in many cases, there are significant costs associated with the production of the information content available on the Web. Content providers must be compensated for these costs in order to remain viable. Several compensation schemes have been devised. One such scheme is to provide the desired content without charge to the consumer, but to include paid advertisements with the desired content. The payments by advertisers for the advertisements constitutes the compensation received by the content provider.

Advertisers pay for the delivery of their message to consumers. Advertiser's willingness to pay depends upon the number of consumers who receive the advertising message. The greater the number of consumers reached, the more advertisers are willing to pay. In addition, advertisers are willing to pay extra to reach demographic groups that are more likely than average to be receptive to a particular advertising message. However, a problem arises on the World Wide Web because the architecture of the Web makes it difficult to obtain accurate measurements of the numbers and demographic attributes of consumers receiving a particular advertising message. While the number of times a particular advertising message has been delivered from a server may be precisely measured, it is not known how to correlate such delivery measurements with actual consumers reached. For example, an indeterminable portion of the total accesses to a server may be due to automated agent machines, such as "web crawlers", which are searching the Web for data collection, indexing and filtering. As another example, a single access to a server might be made by a "proxy server", which then saves the content and re-distributes it to a user community. The size of this user community cannot be determined by the original server. A further problem arises in that, even if the number of consumers reached by an advertisement were measurable, the demographic attributes of those consumers still could not be measured.

SUMMARY OF THE INVENTION

The present invention is a system and method for client/server communications on the World Wide Web which allows the user to control information that is revealed to a server and that is delivered from a server.

A client system is communicatively coupled to a server. User information about a user on the client system is stored on the client system. A user information request is received from the server. The requested user information is compared with the stored user information, at the client. User information is transmitted from the client to the server based on the comparison between the requested user information and the stored user information. Information is received from the server that is based on the user information transmitted from the client to the server.

BRIEF DESCRIPTION OF THE DRAWINGS

The details of the present invention, both as to its structure and operation, can best be understood by referring to the accompanying drawings, in which like reference numbers and designations refer to like elements.

FIG. 2b is a block diagram of one embodiment of an Internet communication system, according to the present invention.

FIG. 4b is a flow diagram of a subprocess of step 408 of FIG. 4a.

FIG. 5a is an exemplary format of a persona definition 318 of FIG. 3.

FIG. 5b is an exemplary format of a demographic request 520.

FIG. 5c is an exemplary format of a response 530 to the demographic request shown in FIG. 5b.

FIG. 7 is an exemplary format of a user interest vector 700.

DETAILED DESCRIPTION OF THE INVENTION

Figure 1:
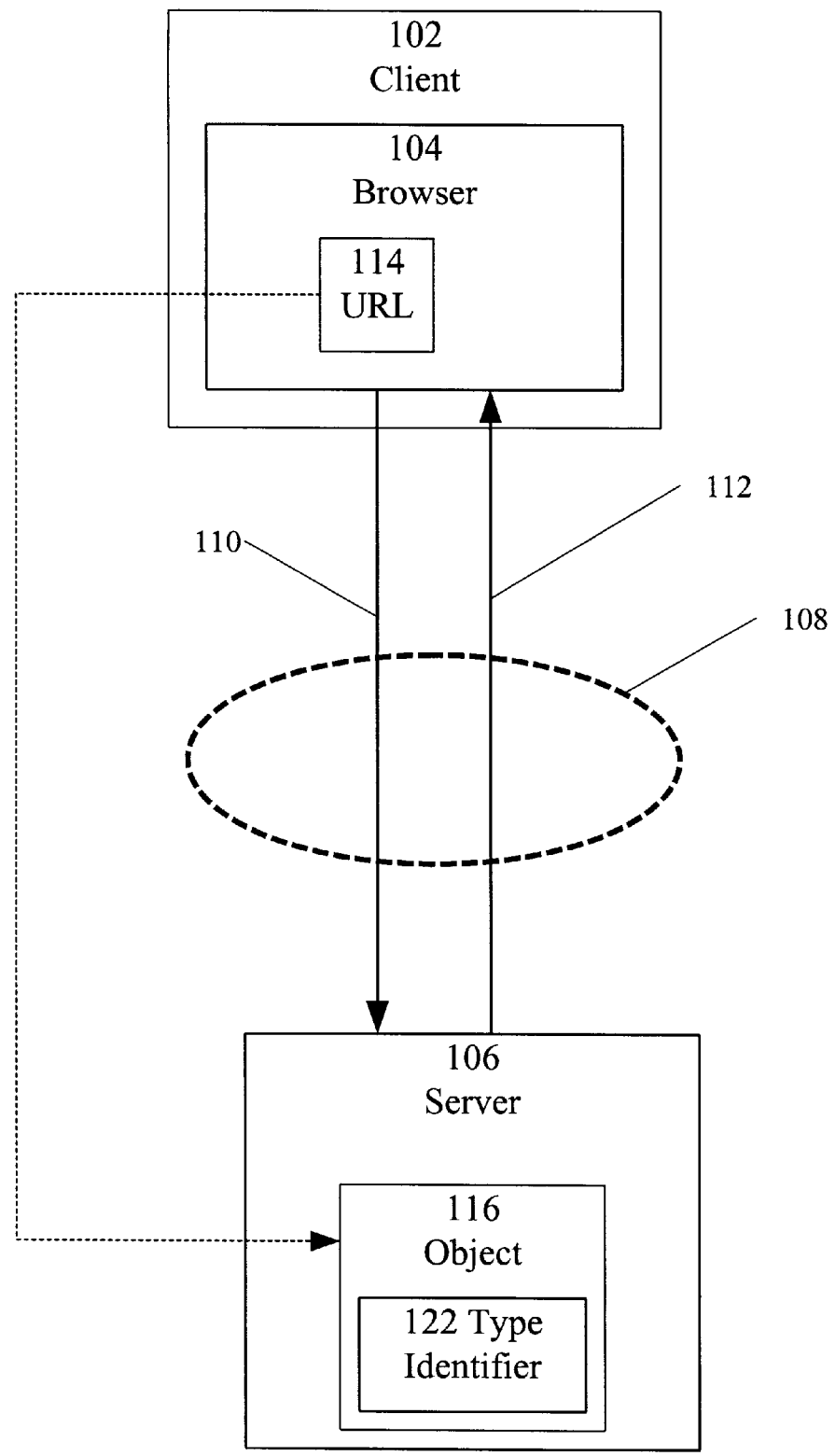
FIG. 1 is a block diagram of a typical conventional Internet communication system.

A typical conventional Internet communication system is shown in FIG. 1. Client computer system 102 communicates with server computer system 106 over the Internet 108. For simplicity, only one client and one server are shown, although many servers and clients are actually connected to the Internet. Client system 102 executes a browser application program 104 that allows a user of client system 102 to access objects, such as documents, graphics, programs, etc., that are stored on a server, such as server 106, through the Internet. The browser displays graphics and/or text which represents, identifies or describes objects which may be accessed. The user selects an object to be accessed, typically by clicking on the text or graphics representing the object. Each object is identified by an Internet address known as a uniform resource locator (URL). For example, object 116, which is stored on server 106, is identified by URL 114. The URL specifies the location of an object on the Internet, including the server on which the object is located and the location of the object on that server. Browser 104 stores an URL identifying each object for which text or graphics are displayed by the browser.

In response to the selection by the user of an object, such as object 116, which is identified by URL 114, browser 104 uses URL 114 to initiate an access 110 to object 116. Server 106 then initiates a transmission 112 of object 106 to client system 102. Each object includes an identifier of the type of the object. In FIG. 1, object 116 includes type identifier 122. Common object types include, for example, "Hyper Text Markup Language" (HTML) objects and "Graphical Interchange Format" (GIF) objects. The object type identifier allows the browser to properly process and display the received object. The object type is not usually communicated to the user.

Figure 2A:
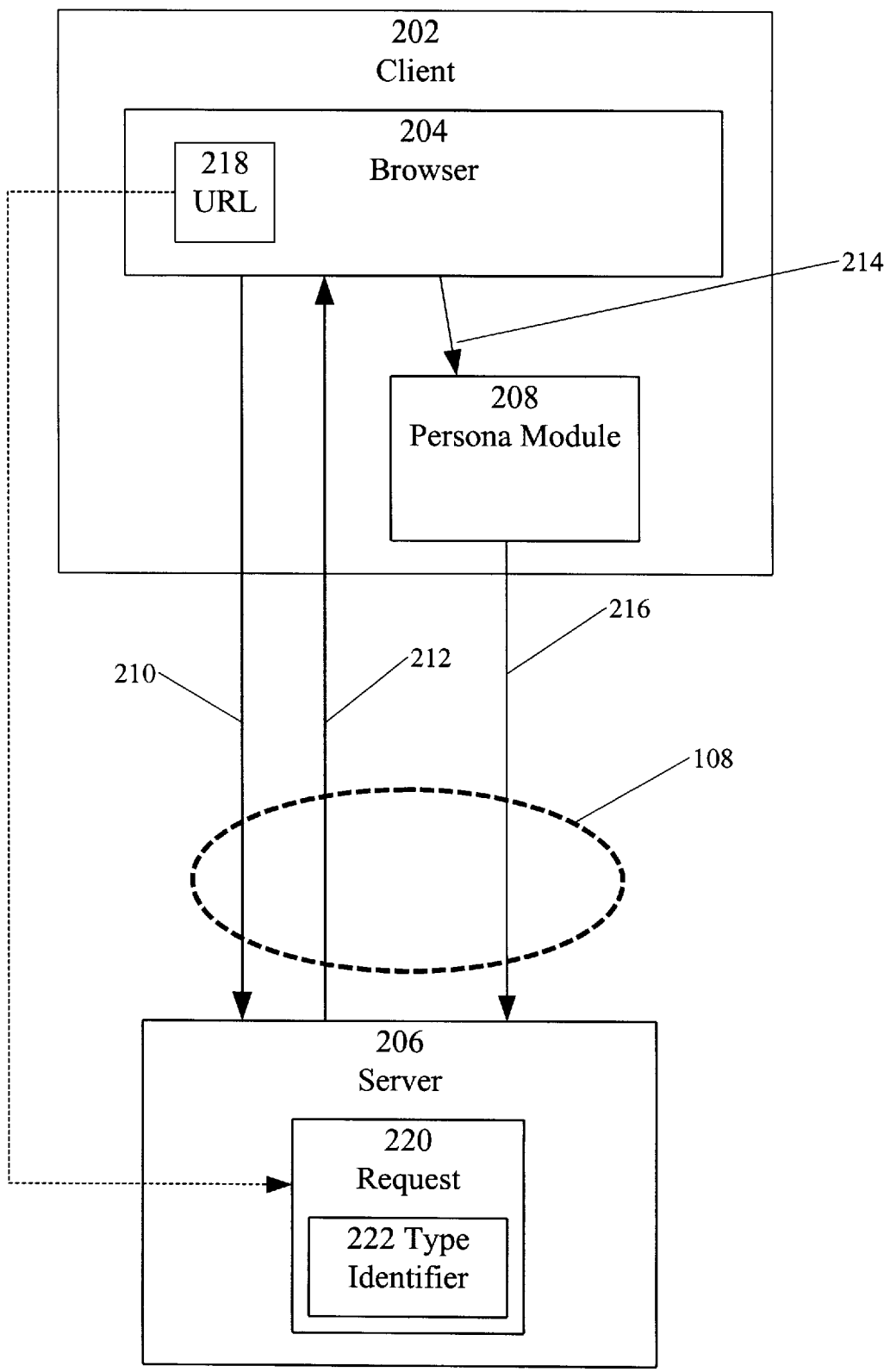
FIG. 2a is a block diagram of one embodiment of an Internet communication system, according to the present invention.

FIG. 2a is a block diagram of one embodiment of an Internet communication system, according to the present invention. A user of client system 202 selects an object identified by URL 218. URL 218 identifies an object on server 206, which happens to be a demographic request 220. Browser 204 initiates access 210 of server 206, which initiates a transmission 212 of request 220. Browser 204 receives request 220 and examines included type identifier 222. Type identifier 222 indicates that the object is a demographic request, so browser 204 sends the request to persona module 208. Persona module 208 processes request 220 and transmits a response 216 to server 206.

In a preferred embodiment, the persona module is a plug-in module of the browser, as shown in FIG. 2b. Browser application program 250 includes application routines 252 and plug-in interface 254. Application routines 252 implement all of the "built-in" functions of browser 250. Plug-in interface 254 interfaces plug-in modules 260a–z with application routines 252. Plug-in modules 260a–z are not part of browser 250, but plug-in interface 254 allows the plug-in modules to function as though they were part of browser 250. This mechanism allows functions to be added to browser 250, without making any changes to browser 250. Thus, the capability to process demographic requests could be added to existing browsers, without making any changes to the browsers.

In this embodiment, when browser 250 receives a request, it examines the included type identifier and routes the request to the appropriate plug-in module for processing.

Figure 2C:
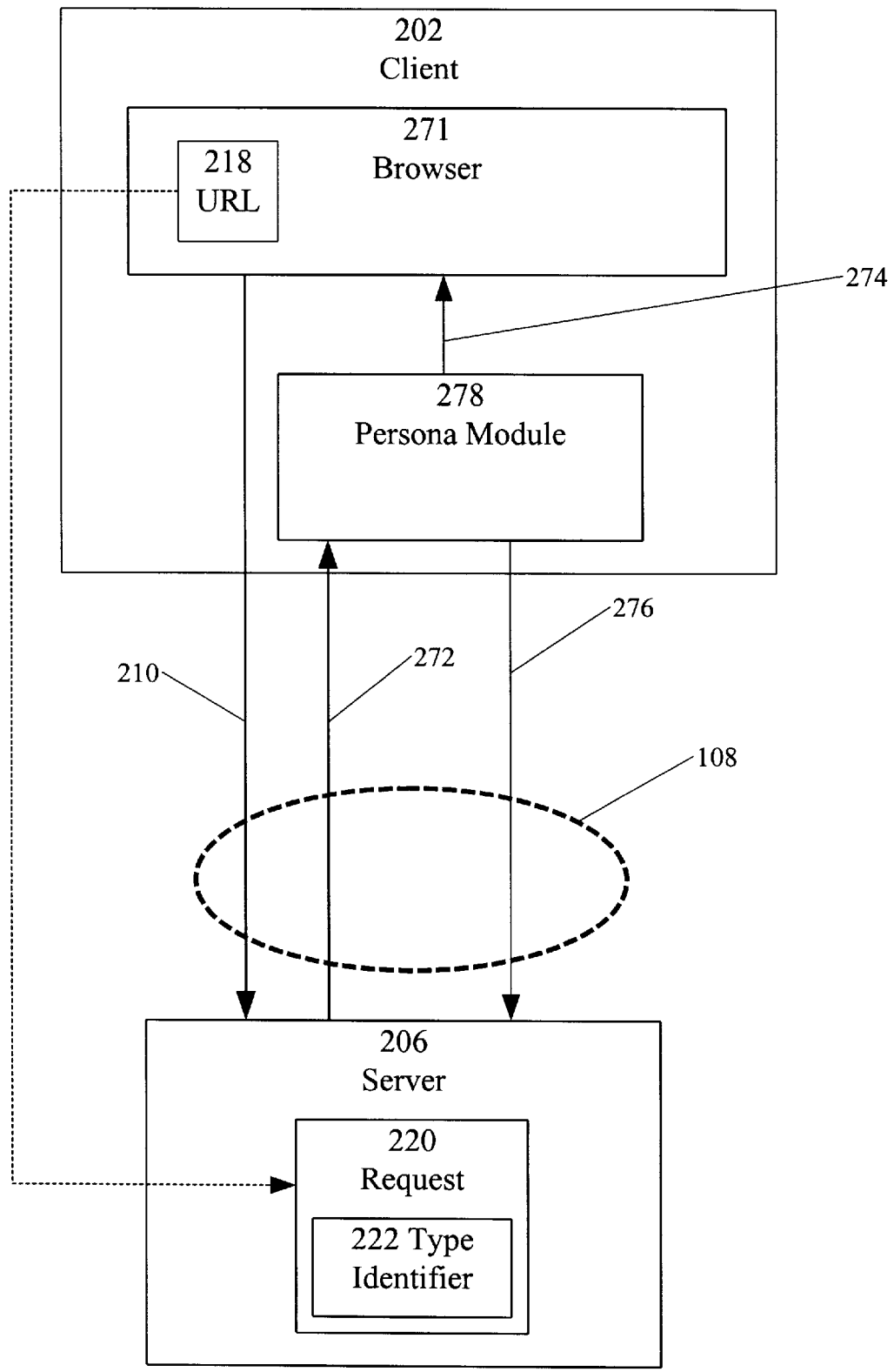
FIG. 2c is a block diagram of another embodiment of an Internet communication system, according to the present invention.
Figure 3:
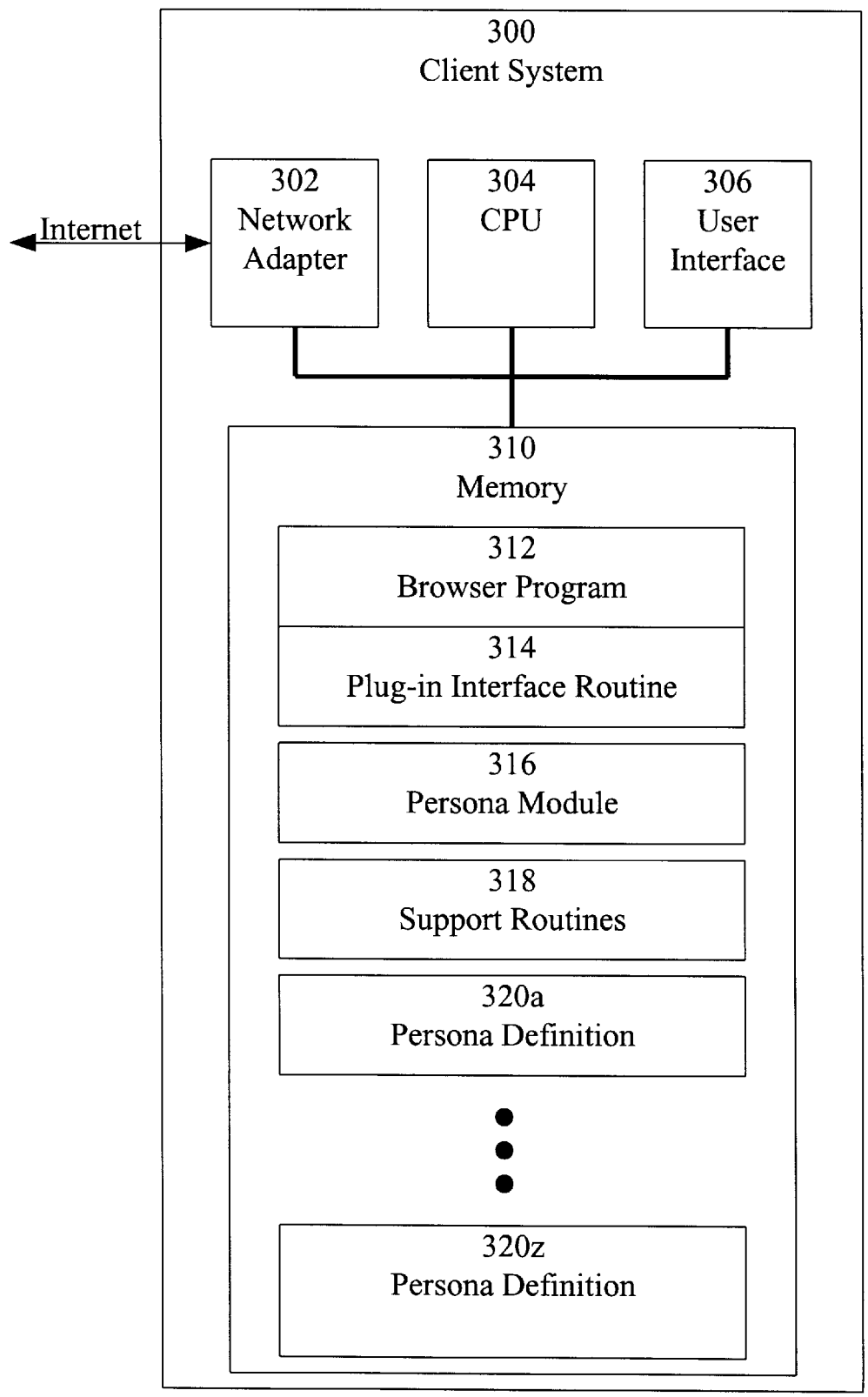
FIG. 3 is a block diagram of an exemplary client system 300, shown in FIGS. 2a–c.

Another embodiment of an Internet communication system, according to the present invention, is shown in FIG. 2c. In this embodiment, persona module 278 is interposed between communications from the Internet and browser 271. Browser 271 initiates accesses 210, but responses are received by persona module 278. Module 278 examines the type identifier 222 of the received object. If the object is identified as a demographic request, persona module processes it an transmits a response message 276. If the object is not a demographic request, it is passed through to browser 271 for processing An exemplary client system 300 is shown in FIG. 3. System 300 includes central processing unit (CPU) 304, which is connected to network adapter 302, user interface 306 and memory 310. Network adapter 302 couples system 300 to the Internet, allowing data communications with servers coupled to the Internet. Network adapter 302 typically includes a modem, either internal or external, but may include an ISDN adapter, local or wide area network adapter, etc. User interface 306 accepts input from a user and displays output generated by system 300 to the user. User interface 306 typically includes a mouse, keyboard and monitor, but may also include other devices, such as a graphics tablet, trackpad, trackball, scanner, printer, etc.

Memory 310 is accessible by CPU 304 and stores program instructions executed by CPU 304 and data used during program execution. Memory 310 typically includes devices such as random-access memory (RAM), read-only memory (ROM), programmable read-only memory (PROM), erasable programmable read-only memory (EPROM), electrically erasable programmable read-only memory (EEPROM), and storage devices, such as hard disk drives, floppy disk drives, tape drives, optical drives, etc.

Memory 310 includes browser program 312, plug-in interface routine 314, persona module 316, support routines 318 and persona definitions 320a–z. Browser program 312 implements all of the "built-in" functions of browser 250. Plug-in interface 254 interfaces plug-in modules with browser program 312. Persona module 316 processes demographic requests and generates response messages. Support routines 318 include other plug-in modules. Persona definitions 320a–z each contain data defining a particular persona of the user.

Figure 4A:
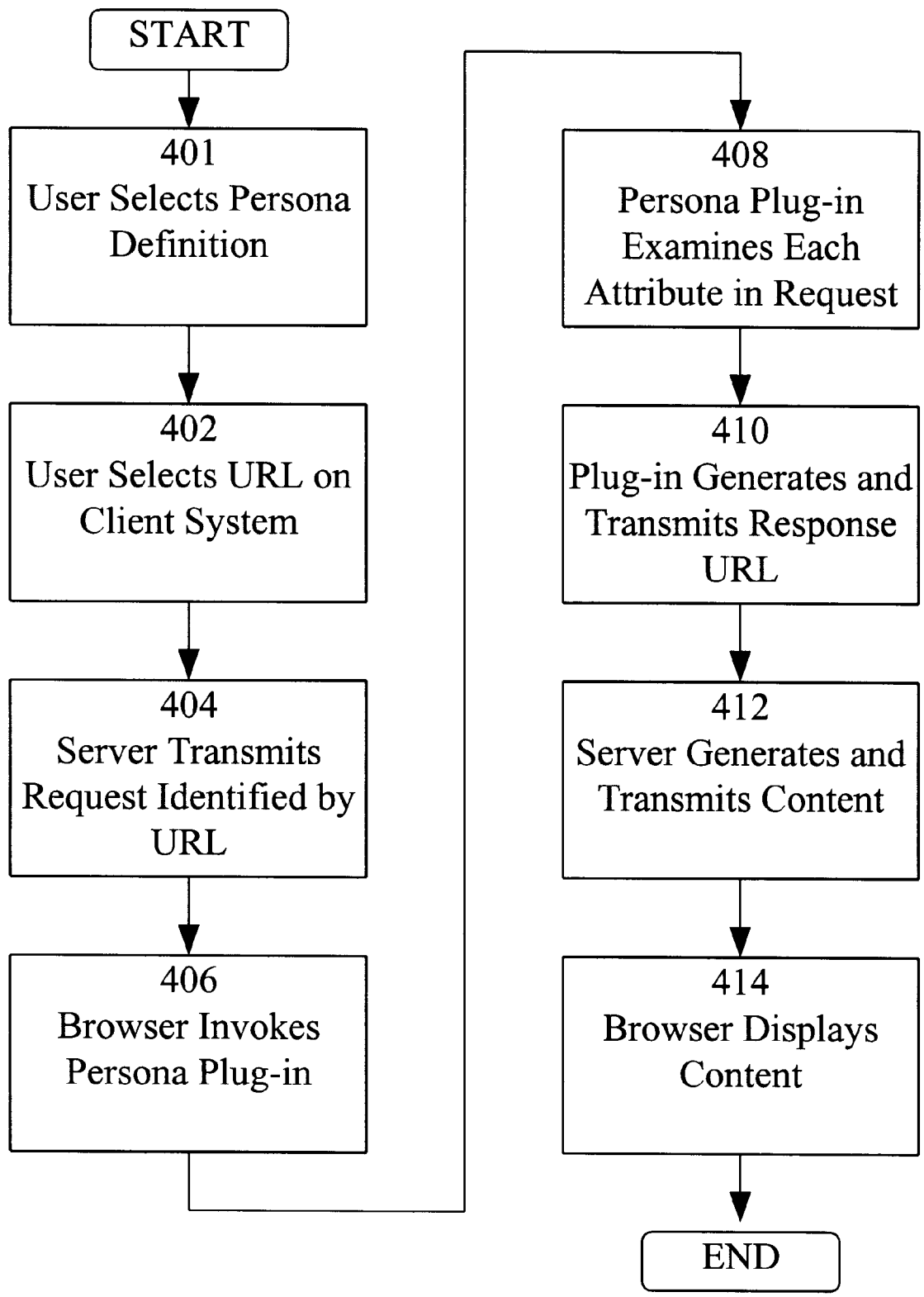
FIG. 4a is a flow diagram of a communication process, according to the present invention.

A flow diagram of a persona communication process is shown in FIG. 4a. The process begins with step 401, in which a user selects a persona definition to use for an Internet session. In step 402, the user selects an URL identifying an object, which happens to be a request, that is to be accessed. The client system being used initiates an access of the selected URL. The URL identifies a server as well as an object stored on that server. In step 404, the server identified by the URL transmits the request identified by the URL. In step 406, the browser receives the request, recognizes that it is to be processed by the persona module, invokes the persona module and passes the request to the persona module. In step 408, the persona module examines each attribute included in the request, as is shown in greater detail in FIG. 4b. In step 410, the persona module generates and transmits a response URL to the server. In step 412, the server receives the response URL, generates the content, if necessary, and transmits the content to the client system. In step 414, the browser displays the received content.

Figure 4B:
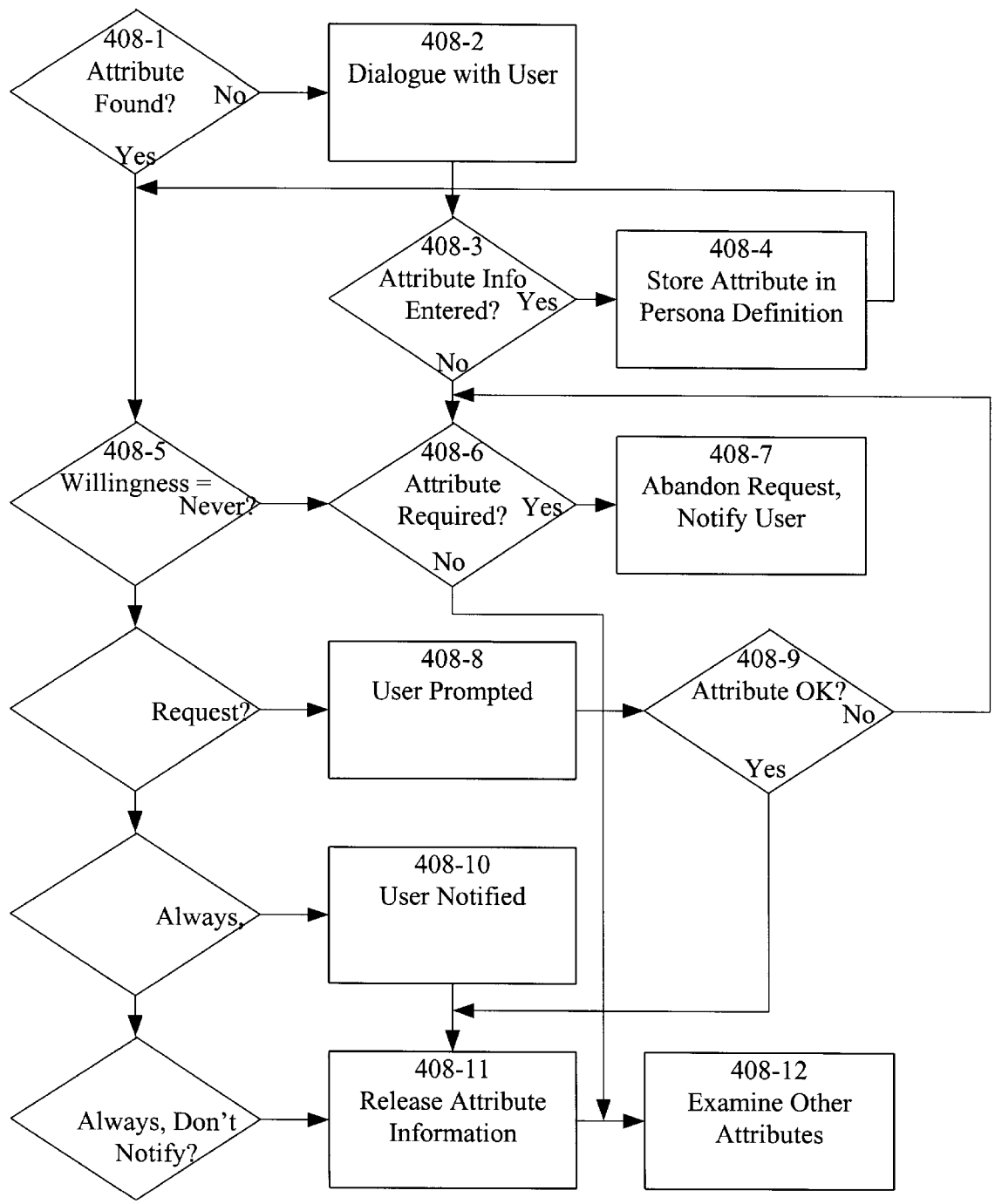

In FIG. 4b, a flow diagram of a subprocess of step 408 of FIG. 4a is shown. This subprocess is repeated for each attribute requested by the demographic request. In step 408-1, an attribute in the request is compared to the attributes that have been defined in the persona definition that is currently being used. If the attribute in the request is found among those attributes that have been defined, the process continues with step 408-5. If the attribute is not found among those attributes that have been defined, the process goes to step 408-3, in which the persona module initiates a dialog with the user requesting information and a willingness level for the attribute. In step 408-3, it is determined whether the use entered the requested information and willingness level. If the requested information and willingness level are not entered, the process continues with step 408-6. If the requested information and willingness level are entered, the process continues with step 408-4, in which the entered attribute information and willingness level are stored in the selected persona definition. The process then continues with step 408-5.

In step 408-5, the willingness level in the attribute definition is examined. If the willingness level equals "Never", meaning the attribute is never to be released to a server, the process continues with step 408-6, in which it is determined whether the requested attribute is required by the demographic request. If the requested attribute is required, the process continues with step 408-7, in which the request is abandoned and the user so notified. If the requested attribute is not required, the process continues with step 480-12, in which the other requested attributes are examined.

If the willingness level in step 408-5 equals "Request", the process continues with step 408-8, in which the user is prompted to authorize release of the requested attribute information to the server. In step 408-9, it is determined whether the user so authorized the release. If the user did not authorize release of the attribute information, the process continues with step 408-6, in which it is determined whether the attribute is required. If the user did authorize release of the attribute information, the process continues with step 408-11, in which the attribute information is released. In step 408-12, the other requested attributes are examined.

If the willingness level in step 408-5 equals "Always, Notify", the process continues with step 408-10, in which the user is notified that the requested attribute will be released. In step 408-11 the attribute information is released. In step 408-12, the other requested attributes are examined.

If the willingness level in step 408-5 equals "Always, Don't Notify", the process continues with step 408-11, in which the attribute information is released. In step 408-12, the other requested attributes are examined.

An exemplary format of a persona definition 318 of FIG. 3 is shown in FIG. 5a. Persona definition 318 includes a plurality of data entries 510a–e. Each data entry includes four fields, that is, an attribute field 502, a type field 504, a willingness field 506 and a value field 508. Attribute field 502 contains an identifier of the attribute related to that data entry. Type field 504 specifies the type of the attribute. For example, data entries 510a–d have attribute type "Data", while data entry 510e has attribute type "Calculated". Willingness field 506 specifies the willingness with which the attribute value should be transmitted. Value field 508 contains the value of the attribute which has been defined.

Attribute type "Data" indicates that the contents of value field 508 are the actual data that is to be transmitted. For example, the attribute type field of data entry 510a contains "Data". The attribute field of this entry contains "Name", indicating that this data entry defines the name the user wishes to use. The willingness field contains "Always, Don't Notify", indicating that the contents of value field 508 are always to be transmitted upon request by the server and the user is never to be notified of the request and transmission.

Attribute type "Calculated" indicates that the data to be released to the server is the result of a calculation or processing which is to be performed, and that a reference to a routine that will perform the processing is contained by value field 508. For example, the attribute type field data entry 510e contains "Calculated". The attribute field of this entry contains "Software Version", indicating that this data entry defines the version of some software in use by or stored on the client system. The willingness field contains "Request", indicating that the user is to be requested to authorize transmission of this attribute. Value field 508 contains a reference to a routine which will determine the software version, for transmission to the server.

An exemplary format of a demographic request 520 transmitted from a server to a client system is shown in FIG. 5b. Request 520 includes a plurality of data entries, such as entries 526a–d. Each data entry includes an attribute field 522 and a required indicator field 524. Attribute field 522 specifies a particular attribute for which information is requested. Field 524 indicates whether the attribute is required by the server. If an attribute is required, the response to the request, which is transmitted from the client system to the server, must contain information regarding that attribute, in order for the server to transmit content to the client system. If the attribute is not required, the server will transmit content to the client system even if no information regarding the attribute is transmitted from the client system to the server.

An exemplary format of a response 530 to a demographic request is shown in FIG. 5c. Response 530 includes an URL 532 that indicates the destination of the response, and appended information 534 that includes the requested demographic information. This format has the advantage that any number of attributes may be included in the response in any order.

The appended information 534 is illustrated in its most complete form. It is understood by anyone skilled in the art that the amount of information transmitted could be reduced by any of a number of techniques, if that were important in a particular system. For example, it is not necessary to re-transmit the attribute names if the user's values are returned in the same order. In addition, well-known techniques of encoding or compression may be employed. For example, if a attribute's values were restricted to yes/no (like the attribute "age over 18"), it is only necessary to transmit a single bit from the client to the server to communicate that.

Figure 6A:
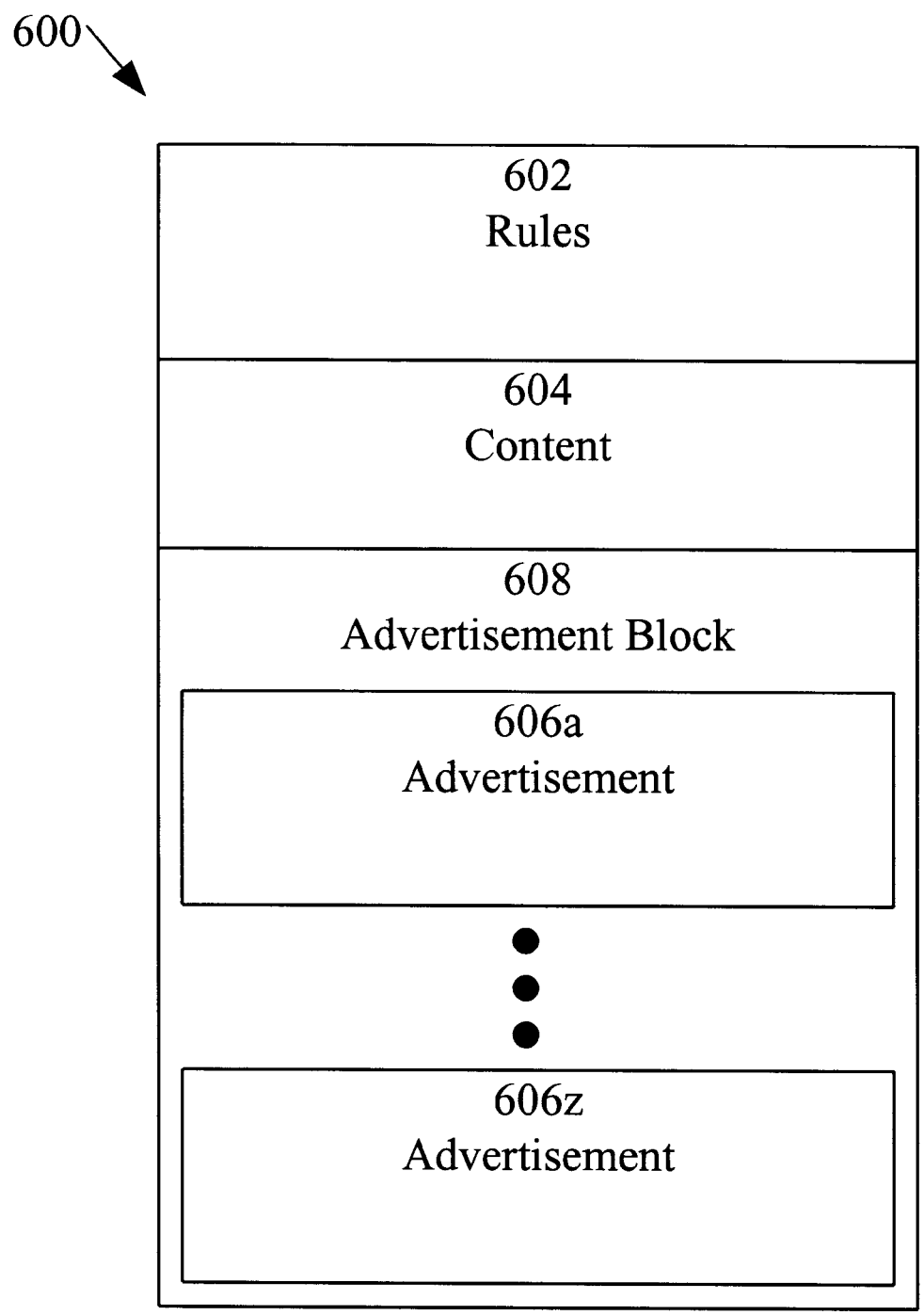
FIG. 6a is an exemplary format of a server message 600, according to one embodiment of the present invention.

The above described embodiments require that significant amounts of information be transmitted from the client system. Users may desire increased privacy. Privacy can be improved with a trade-off in bandwidth/performance of the system. In one embodiment, instead of requesting demographic information from the user before serving the content, the server could serve the content together with a set of advertisements and rules for selecting which advertisements are to be shown with the content. FIG. 6a is an exemplary format of a message 600 of this embodiment. Message 600 includes rules 602, content 604 and advertisement block 608. Advertisement block 608 includes a plurality of advertisements 606a–z. Rules 602 are interpreted by the persona module and allow it to select the advertisements that are to be displayed to the user based on the user's stated preferences, demographic information and/or calculated attributes, as defined in the persona definition in use. Content 604 is displayed to the user, along with the advertisements selected from among advertisements 606a–z.

In this embodiment, the persona module is acting as a user's agent, filtering out irrelevant advertisement material or customizing the advertisement, but not returning information about the user's interest or preferences to the server. For example, the persona module might select to advertise the caffeinated or decaffeinated version of a coffee product.

Figure 6B:
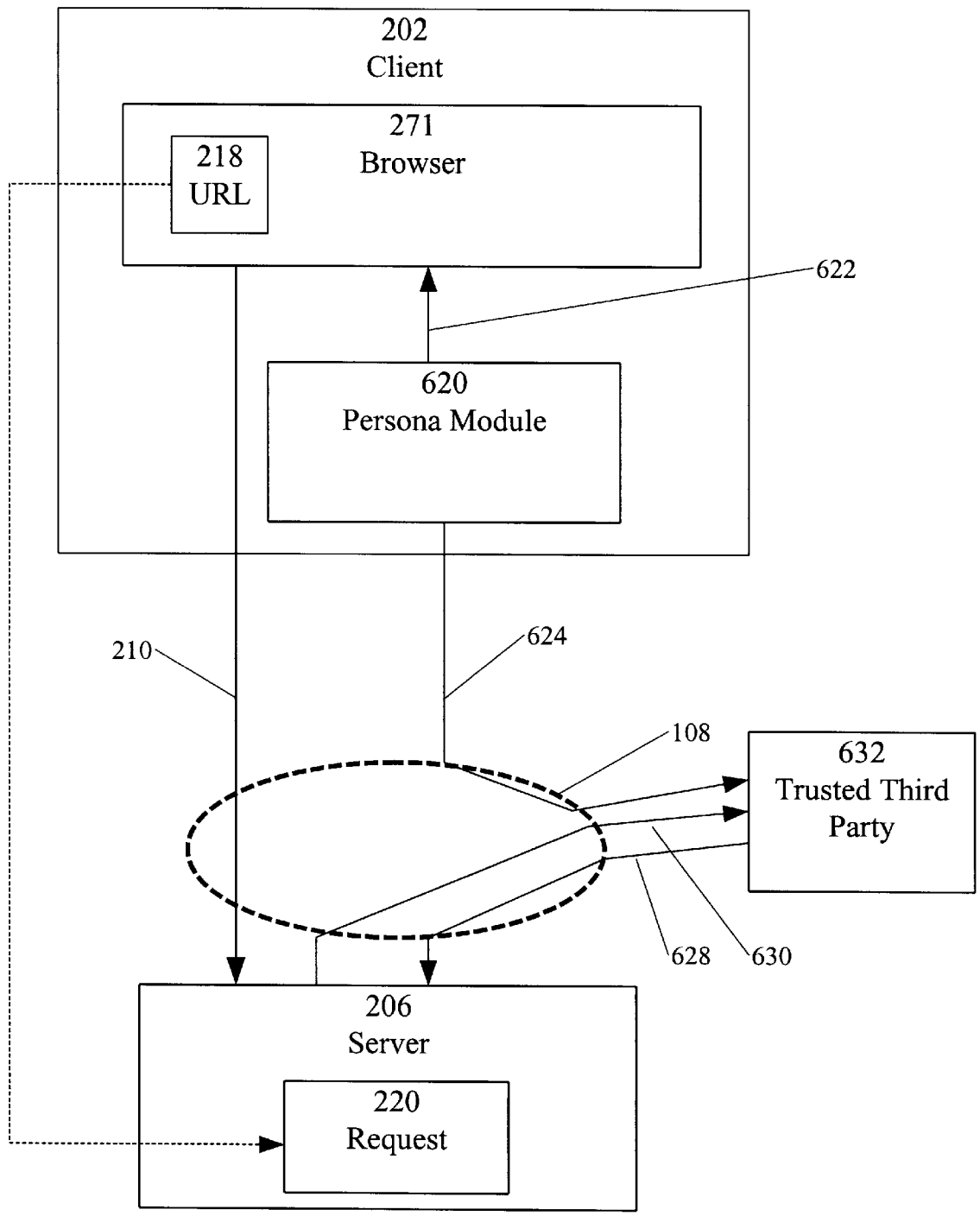
FIG. 6b is a block diagram of an Internet communication system, according to one embodiment of the present invention.

A third party could act as an intermediary between the persona module and the content provider. In the embodiment shown in FIG. 6b, a trusted third party 632 is interposed between server 206 and persona module 620. Third party 632 only reveals aggregate demographic information about all the users accessing the server, never specific transaction information. Demographic information messages 624 are transmitted from persona module 620 to third party 632, where they are processed to form aggregated information. When browser 271 initiates an access 210 of request 220, server 206 transmits a demographic request 630, which is routed to third party 632. Third party 632 generates a response message 628 and transmits it to server 206. Server 206 then transmits the content to client system 202.

A user's privacy may be further protected if the demographic information returned to a server is at least partially untruthful. A user might generate one or more personas that include false or incorrect information about the user. This allows the user to access information without revealing information about himself. The less truthful a user's responses, the greater protection of privacy.

There are intermediate levels between completely revealing and completely unrevealing schemes. An advertiser might only be concerned with aggregate demographic information, not with individual user information. A further useful aspect of the present invention automatically disguises the user's demographic information.

Figure 6C:
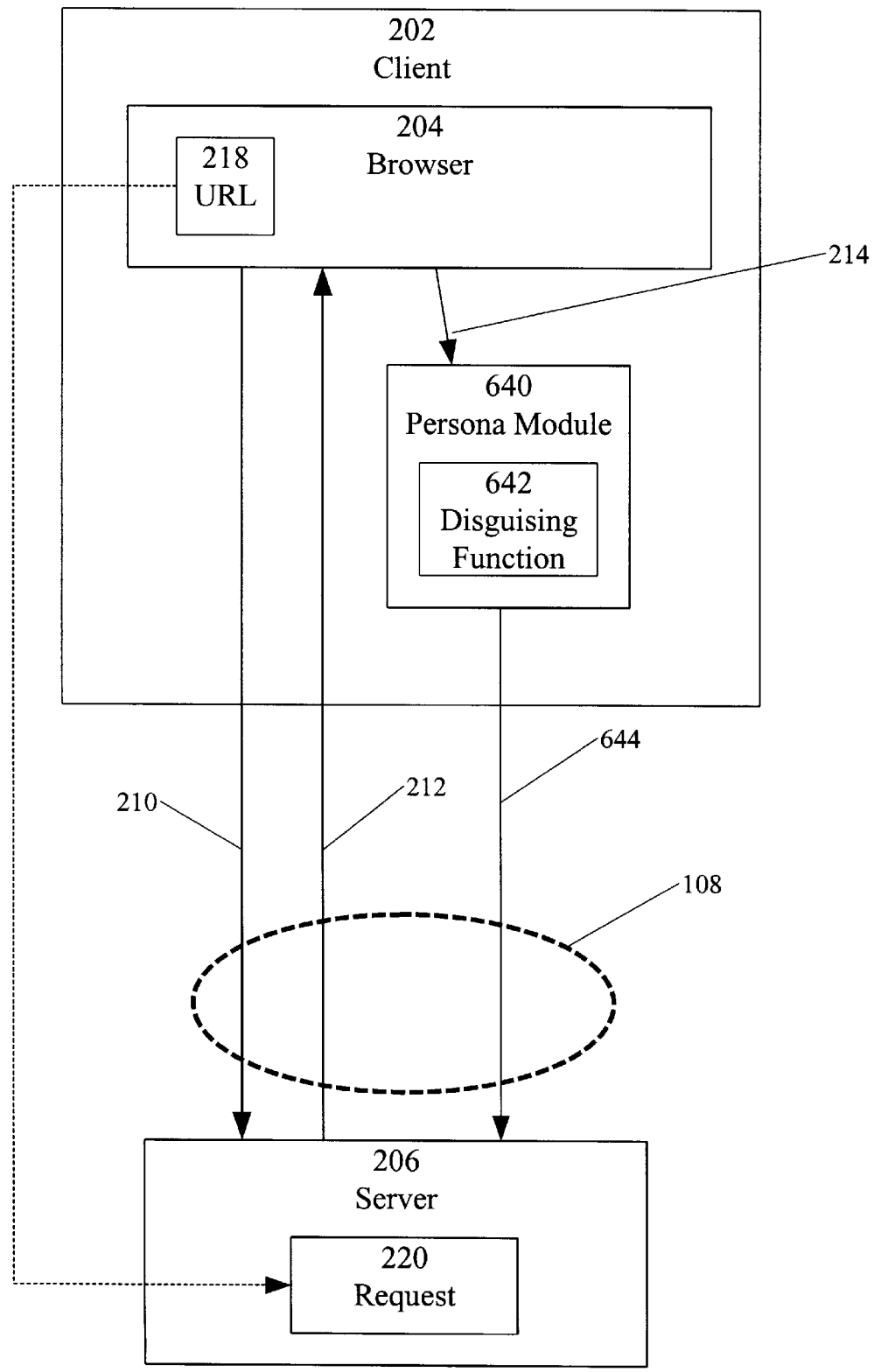
FIG. 6c is a block diagram of an Internet communication system, according to one embodiment of the present invention.

In one embodiment of this aspect, shown in FIG. 6c, the information that is returned to the server allows it to estimate only a probability that a particular user has a particular demographic attribute. In the aggregate, these probabilities still allow the server to collect usable demographic statistics, but protect user privacy in that individual transactions are not completely revealing. A disguising function 642 is incorporated into the persona module 640 that causes the persona module to randomly lie when it returns demographic information 644. For example, if a demographic attribute was given a binary (yes/no) value, a disguising function that lied about this attribute 50% of the time would reveal no information to the server. If the disguising function lied 0% of the time, the information would be completely revealed. Any other percentage would be a compromise between completely revealing and completely unrevealing.

Another embodiment of a response message, called the signature vector, can further protect end user privacy while still providing valuable information the server. FIG. 7 shows an exemplary format of the user's personal interest data. As part of the initial work in setting up the system, statistical techniques would be used to collect such interest data from a large set, such as 10,000 individuals. Using well-known statistical clustering techniques, cluster centroids (for example, 50) are then computed. Each cluster centroid represents a statistically generated "person" of a generic type. The interest data of these pre-computed generic types would be stored in the persona module.

When the server requests a "signature vector", the persona module examines the particular user's interests against the stored interest vectors for the generic types. The persona module computes a similarity score for the user's interests against each generic type's interest. For example, the result might be "I am very much like type #1", "I am not at all like type #2", "I am somewhat like type #3", an so on for all 50 types. Using 2 bits to encode each similarity score, 100 bits can represent the user's correlations with all 50 previously stored generic types. This becomes the user's "signature vector". Only signature vectors are then revealed to the server. In this example, the use of the signature vector (100 bits), rather than the raw data of the interest vector, decreases the amount of data sent from client to server, decreases the corresponding effort at the server, and affords a degree of privacy protection for the user.

As a further enhancement to the user's privacy, an advertiser, seeking to learn a user's receptiveness to a particular ad would compile a "signature vector" of the ad. This vector would be interpreted: "Generic person type #1 is not receptive at all to this ad", "Generic person type #2 is somewhat receptive to this ad", "Generic person type #3 is very receptive to this ad", and so on for all 50 generic person types. (The advertiser would have determined this by previously testing the ad.) It can be seen that the mathematical inner product of the user's signature vector with the ad's signature vector is a measure of how receptive that particular user is to that particular ad. (Of course, other distance measures on the two vectors could also serve this purpose.) In this privacy enhancement, the server presents the ad's signature with the request, and the persona module computes and returns the receptiveness measure only. The degree of receptiveness then determines whether the full advertisement is set to the user.

The interest signature may be revealed to a trusted third party who matches the signature with advertising information and forwards selected advertising to the user. A three party protocol, in which a third party broker makes the match but does not know the signature, may be used. To do this, the persona module generates a random permutation function, denoted p, and sends it to the advertiser. The result of the permeation function p is then applied to the user's interest vector I, yielding p(I), and p(I) is sent from the persona module to the broker. The advertiser generates the result of the permutation function p applied to signature S of the item to be advertised, forming p(S). The advertiser then sends p(S) and the advertisement to the broker. The broker generates the inner product of p(I) and p(S), which is the same as the inner product of I and S, but neither I nor S has been revealed to the broker. If the inner product indicates a good match, the broker sends the advertisement to the user and charges a fee to the advertiser.

Although a specific embodiment of the present invention has been described, it will be understood by those of skill in the art that there are other embodiments which are equivalent to the described embodiment. Accordingly, it is to be understood that the invention is not to be limited by the specific illustrated embodiment, but only by the scope of the appended claims.

What is claimed is:

1. A method of communications between a client system and a server communicatively coupled to the client system, comprising the steps of:

storing user information about a user on the client system, the user information comprising a plurality of attributes, each attribute comprising information relating to the user and a willingness level indicator, indicating a level of willingness of the user to reveal the information of that attribute;

receiving a user information request from the server, the user information request comprising a plurality of attribute requests, each attribute request comprising an indication of whether the attribute is required in order for the server to transmit information stored on the server to the client system;

comparing, at the client system, the received attribute requests with the stored attributes to determine whether each requested attribute is present on the client system;

determining, at the client system, for each requested attribute that is present on the client system, whether the attribute is to be transmitted to the server as a function of the willingness level indicator of the attribute and the indication of whether the attribute is required; and transmitting to the server each attribute that has been determined is to be transmitted.

2. The method of claim 1, wherein the step of transmitting user information from the client to the server comprises the steps of:

transmitting no user information to the server, if the user is unwilling to reveal at least one attribute required by the server;

requesting that the user enter an attribute, if at least one attribute required by the server is not included in the stored user information; and transmitting the attributes that the user is willing to reveal, if the user is willing to reveal all attributes required by the server.

3. The method of claim 2, further comprising the step of:

receiving information from the server based on the user information transmitted from the client system to the server.

4. The method of claim 2, wherein the user information comprises demographic information.

5. The method of claim 2, wherein the user information comprises security information.

6. The method of claim 2, wherein the user information comprises financial information.

7. The method of claim 3, wherein the information transmitted from the server to the client comprises advertising.

8. The method of claim 2, wherein the step of transmitting user information from the client to the server comprises the steps of:

generating disguised user information; and transmitting disguised user information from the client to the server based on a comparison between the requested user information and the disguised user information.

9. The method of claim 8, wherein the disguised user information is generated based on the stored user information.

10. The method of claim 8, wherein the disguised user information is a distorted representation of the stored user information.

11. The method of claim 2, wherein the step of transmitting user information from the client to the server comprises the steps of:

generating aggregate user information based on the stored user information; and transmitting aggregate user information from the client to the server based on a comparison between the requested user information and the aggregate user information.

12. A client system coupled to a server, comprising:

a processor;

a memory storing user information about a user, the user information comprising a plurality of attributes, each attribute comprising information relating to the user and a willingness level indicator, indicating a level of willingness of the user to reveal the information of that attribute;

a first receiver receiving a user information request from the server the user information request comprising a plurality of attribute requests, each attribute request comprising an indication of whether the attribute is required in order for the server to transmit information to the client system;

a comparison device comparing the received attribute requests with the stored attributes to determine whether each requested attribute is present on the client system;

a determination device determining, for each requested attribute that is present on the client system, whether the attribute is to be transmitted to the server as a function of the willingness level indicator of the attribute and the indication of whether the attribute is required; and a transmitter transmitting to the server each attribute that has been determined is to be transmitted.

13. The system of claim 12, wherein the selection device:

selects no user information, if the stored user information includes at least one attribute having an indicator indicating that the user is unwilling to reveal the attribute and that attribute is required by the server;

requests that the user enter an attribute, if at least one attribute required by the server is not included in the stored user information; and selects the attributes that the user is willing to reveal, if all attributes required by the server are included in the stored user information and have indicators indicating that the user is willing to reveal the attributes.

14. The system of claim 13, further comprising:

a second receiver receiving information from the server that is based on the user information transmitted from the client to the server.

15. The system of claim 13, further comprising:

a device generating aggregate user information based on the stored user information.

16. The system of claim 13, wherein the stored user information comprises demographic information.

17. The system of claim 13, wherein the stored user information comprises security information.

18. The system of claim 13, wherein the stored user information comprises financial information.

19. The system of claim 13, wherein the information transmitted from the server to the client comprises advertising.

20. The system of claim 13, wherein the transmitter comprises:

a device generating disguised user information; and a transmitter transmitting user information from the client to the server based on the comparison between the requested user information and the disguised user information.

21. The system of claim 20, wherein the generating device generates disguised user information based on the stored user information.

22. The system of claim 20, wherein the disguised user information is a distorted representation of the stored user information.

23. The system of claim 15, wherein the comparison device compares the requested user information with the aggregate user information and the selection device selects aggregate user information based on a comparison between the requested user information and the aggregate user information.

24. A computer program storage device, comprising:

a computer readable medium embodying computer program instructions for a method of communications between a client system and a server, the client system comprising a processor, the program instructions executed by the processor, the method comprising the steps of:

storing user information about a user on the client system, the user information comprising a plurality of attributes, each attribute comprising information relating to the user and a willingness level indicator, indicating a level of willingness of the user to reveal the information of that attribute;

receiving a user information request from the server the user information request comprising a plurality of attribute requests, each attribute request comprising an indication of whether the attribute is required in order for the server to transmit information to the client system;

comparing, at the client system, the received attribute requests with the stored attributes to determine whether each requested attribute is present on the client system;

determining, at the client system, for each requested attribute that is present on the client system, whether the attribute is to be transmitted to the server as a function of the willingness level indicator of the attribute and the indication of whether the attribute is required; and transmitting to the server each attribute that has been determined is to be transmitted.

25. The computer program storage device of claim 24, wherein the stored user information comprises at least one attribute which the user is willing to reveal, the requested user information comprises at least one attribute which is required by the server and the step of transmitting user information from the client to the server comprises the steps of:

transmitting no user information to the server, if the user is unwilling to reveal at least one attribute required by the server;

requesting that the user enter an attribute, if at least one attribute required by the server is not included in the stored user information;

transmitting the attributes that the user is willing to reveal, if the user is willing to reveal all attributes required by the server.

26. The computer program storage device of claim 25, wherein the method further comprises the step of:

receiving information from the server that is based on the user information transmitted from the client to the server.

27. The computer program storage device of claim 25, wherein the step of transmitting user information from the client to the server comprises the steps of:

generating disguised user information; and transmitting user information from the client to the server based on the comparison between the requested user information and the disguised user information.

28. The computer program storage device of claim 25, wherein the user information comprises demographic information.

29. The computer program storage device of claim 25, wherein the user information comprises security information.

30. The computer program storage device of claim 25, wherein the user information comprises financial information.

31. The computer program storage device of claim 25, wherein the information transmitted from the server to the client comprises advertising.

32. The computer program storage device of claim 27, wherein the disguised user information is generated based on the stored user information.

* * * * *